(12) United States Patent
Cho

(10) Patent No.: US 7,492,838 B2
(45) Date of Patent: Feb. 17, 2009

(54) APPARATUS FOR COMPENSATING FOR PHASE MISMATCH IN QPSK DEMODULATOR

(75) Inventor: Tae-Hui Cho, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 582 days.

(21) Appl. No.: 11/325,901

(22) Filed: Jan. 5, 2006

(65) Prior Publication Data
US 2006/0256895 A1 Nov. 16, 2006

(30) Foreign Application Priority Data
Jan. 7, 2005 (KR) .................. 10-2005-0001672

(51) Int. Cl.
*H03D 3/22* (2006.01)
(52) U.S. Cl. ....................... 375/332; 375/324
(58) Field of Classification Search ................ 375/324, 375/329, 331, 332, 340
See application file for complete search history.

(56) References Cited

U.S. PATENT DOCUMENTS

2006/0109893 A1* 5/2006 Chen et al. .................. 375/219

* cited by examiner

*Primary Examiner*—Emmanuel Bayard
(74) *Attorney, Agent, or Firm*—The Farrell Law Firm, PC

(57) ABSTRACT

An apparatus for compensating for a phase mismatch in a Quadrature Phase Shift Keying (QPSK) demodulator that includes a phase mismatch extractor module for generating a signal including a phase mismatch function by mixing an I-channel demodulation signal and a Q-channel demodulation signal, which are output signals of a phase shifter, and extracting the phase mismatch function by filtering the generated signal; and a phase mismatch compensator module for digital-converting the phase mismatch function, mapping the digital-converted phase mismatch function to a first compensation signal, generating a second compensation signal by mixing the digital-converted phase mismatch function with a baseband I-channel signal, generating a third compensation signal by adding a baseband Q-channel signal to the second compensation signal, and mixing the first compensation signal with the third compensation signal.

11 Claims, 3 Drawing Sheets

(PRIOT ART)

APPARATUS FOR COMPENSATING FOR PHASE MISMATCH IN QPSK DEMODULATOR

PRIORITY

This application claims priority under 35 U.S.C. § 119 to an application entitled "Apparatus for Compensating for Phase Mismatch in QPSK Demodulator" filed in the Korean Intellectual Property Office on Jan. 7, 2005 and assigned Ser. No. 2005-1672, the contents of which are incorporated herein by reference.

BACKGROUND OF THE INVENTION

1. Field of the Invention

The present invention relates generally to a Quadrature Phase Shift Keying (QPSK) demodulator using a QPSK scheme, and in particular, to an apparatus for compensating for a phase mismatch due to a phase error between an I-channel signal and a Q-channel signal.

2. Description of the Related Art

In general, the QPSK scheme, which is an expanded concept of a Phase Shift Keying (PSK) scheme or a Binary Phase Shift Keying (BPSK) scheme in wireless communication systems, uses signals having 4 patterns.

For example, in the QPSK scheme, 2-bit digital signals having 4 patterns of '00,', '01,', '10' and '11' are used. Unlike the BPSK scheme of transmitting a broadcasting wave 180° out of phase from each other, the QPSK scheme is a scheme of generating 4 signals 90° out of phase from each other and communicating the signal through a transceiver using the 4 generated signals. As an example, a QPSK demodulator of a Code Division Multiple Access (CDMA) system using the QPSK scheme will now be described.

FIG. 1 is a diagram of a QPSK demodulator of a conventional communication system.

In general, a modulator using the QPSK scheme divides binary data into I-channel binary data and Q-channel binary data, amplitude-modulates the I-channel binary data and the Q-channel binary data using cosine and sine functions, which have a phase difference of 90°, combines the amplitude-modulated I-channel binary data and Q-channel binary data, and transmits the combined binary data. In the QPSK demodulator receiving the transmitted signal, the I- and Q-channel combined signal is mixed with carrier cosine and sine functions using a synchronous detection scheme and passes through a low pass filter (LPF).

Referring to FIG. 1, a QPSK signal is demodulated by the QPSK demodulator of the communication system using the QPSK scheme. The QPSK demodulator includes a radio frequency (RF) module for performing RF processing, which includes an automatic gain controller (AGC) 101, a first mixer 103, a first low pass filter (LPF) 105, a first analog-to-digital converter (ADC) 107, a second mixer 109, a second LPF 111, a second ADC 113, a voltage controlled oscillator (VCO) 115, and a phase shifter 117, and a baseband integrated circuit (IC) 119 for processing a baseband signal.

The AGC 101 amplifies a QPSK signal by controlling the gain of the QPSK demodulator demodulating the QPSK signal to the maintain outputs of the first ADC 107 and the second ADC 113 at desired levels.

The I-channel signal output from the AGC 101 is input to the first mixer 103, and the Q-channel signal is input to the second mixer 109. The I-channel signal is mixed with an I-channel demodulation signal received from the phase shifter 117 by the first mixer 103. The VCO 115 generates a frequency, as controlled by a voltage, and outputs the generated frequency to the phase shifter 117. The phase shifter 117 receives a local oscillation signal output from the VCO 115 and generates the I-channel demodulation signal and a Q-channel demodulation signal, which have a phase difference of 90° from each other.

The first mixer 103 receives the I-channel demodulation signal output from the phase shifter 117, mixes it with the I-channel signal, and outputs the mixed I-channel signal to the first LPF 105. The first LPF 105 receives the output signal of the first mixer 103, filters the signal, and outputs the filtered signal to the first ADC 107. The first ADC 107 receives the signal filtered by the first LPF 105, analog-to-digital converts the received signal, and outputs the digital signal to the baseband IC 119.

The Q-channel signal is mixed with the Q-channel demodulation signal received from the phase shifter 117 by the second mixer 109. The second mixer 109 receives the Q-channel demodulation signal output from the phase shifter 117, mixes it with the Q-channel signal, and outputs the mixed Q-channel signal to the second LPF 111. The second LPF 111 receives the output signal of the second mixer 109, filters the signal, and outputs the filtered signal to the second ADC 113. The second ADC 113 receives the signal filtered by the second LPF 111, converts the received analog signal to a digital signal, and outputs the converted digital signal to the baseband IC 119.

The baseband IC 119 receives the RF processed I-channel and Q-channel signals and demodulates the QPSK signal.

However, when the QPSK demodulator using the QPSK scheme is utilized, there is generated a phase mismatch due to a phase error between the I-channel signal and the Q-channel signal introduced in the phase shifter 117, or the LPF 105 or 111, or combinations thereof.

Thus, when a signal is demodulated using the I-channel signal and the Q-channel signal having the phase mismatch, the signal cannot be correctly restored. In particular, for a phase mismatch due to the phase shifter 117, a local oscillation frequency is considerably high along with an increase of use of a direct conversion demodulator without using an intermediate frequency. Accordingly, even if the I-channel demodulation signal and the Q-channel demodulation signal output from the phase shifter 117 have a small phase error, if a phase mismatch is generated due to the phase error, the phase mismatch have a negative influence upon the demodulation of the QPSK signal and makes for difficult implementation of the phase shifter 117.

SUMMARY OF THE INVENTION

An object of the present invention is to substantially solve at least the above problems and/or disadvantages and to provide at least the advantages below. Accordingly, an object of the present invention is to provide an apparatus for compensating for a phase mismatch in a Quadrature Phase Shift Keying (QPSK) demodulator.

Another object of the present invention is to provide an apparatus for compensating for a phase mismatch due to a phase error between I-channel and Q-channel signals in a Quadrature Phase Shift Keying (QPSK) demodulator.

A further object of the present invention is to provide an apparatus for compensating for a phase mismatch due to a phase error between I-channel and Q-channel demodulation signals in a Quadrature Phase Shift Keying (QPSK) demodulator.

According to one aspect of the present invention, there is provided an apparatus for compensating for a phase mismatch in a Quadrature Phase Shift Keying (QPSK) demodulator, the apparatus includes a phase mismatch extractor module for generating a signal including a phase mismatch function by mixing an I-channel demodulation signal and a Q-channel demodulation signal, which are output signals of a phase shifter, and extracting the phase mismatch function by filtering the generated signal; and a phase mismatch compensator module for digital-converting the phase mismatch function, mapping the digital-converted phase mismatch function to a first compensation signal, generating a second compensation signal by mixing the digital-converted phase mismatch function with a baseband I-channel signal, generating a third compensation signal by adding a baseband Q-channel signal to the second compensation signal, and mixing the first compensation signal with the third compensation signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
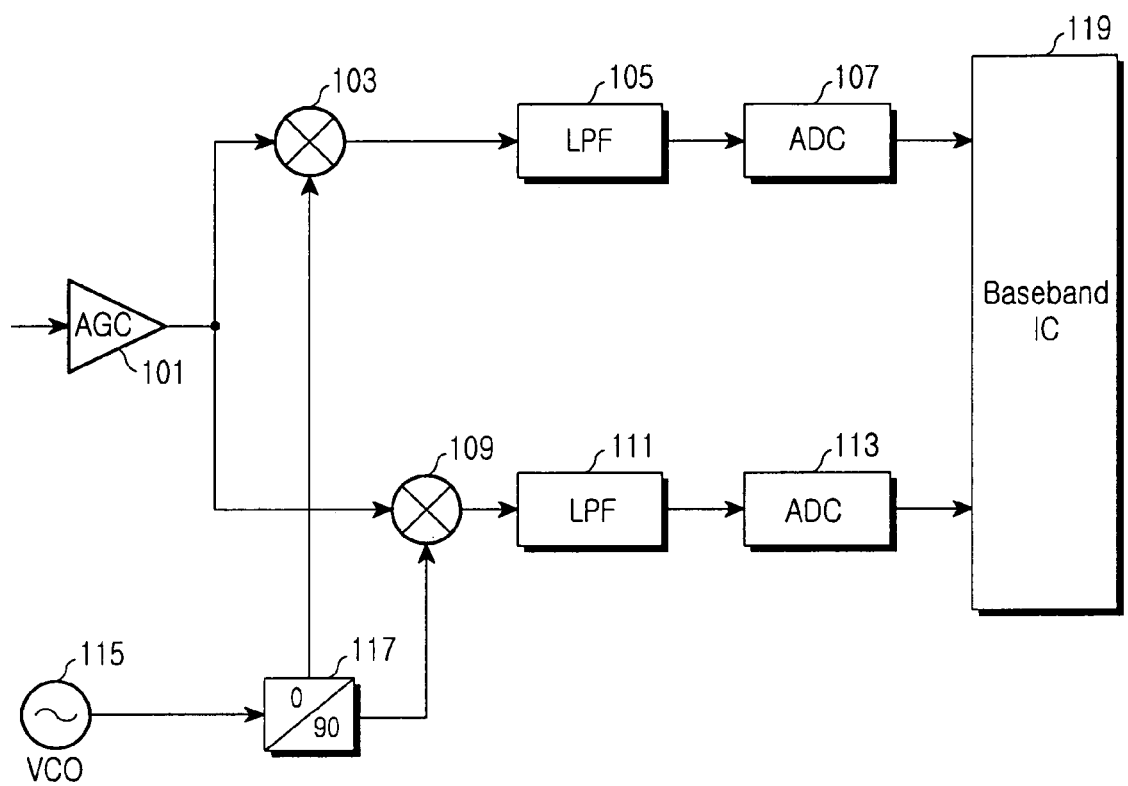
FIG. 1 is a diagram of a QPSK demodulator of a conventional communication system.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In the present invention, a phase error generated by a demodulator utilizing the Quadrature Phase Shift Keying (QPSK) scheme is removed to compensate for a phase mismatch in the demodulator. To do this, an RF module and a baseband IC of the demodulator remove the phase error. In a demodulator using a QPSK scheme, a phase match between an I-channel signal and a Q-channel signal is an important element to determine signal quality, for example, when determining an error vector magnitude (EVM). In a current communication system, use of a signal having a high data rate is increasing, thereby requiring a high level of accuracy during the digital modulation/demodulation process. A phase mismatch of 5° is allowed in a system using the QPSK scheme, and a phase mismatch must be even less in a Quadrature Amplitude Modulation (QAM) scheme. An apparatus for compensating for the phase mismatch will now be described with reference to FIGS. 2 and 3.

Figure 2:
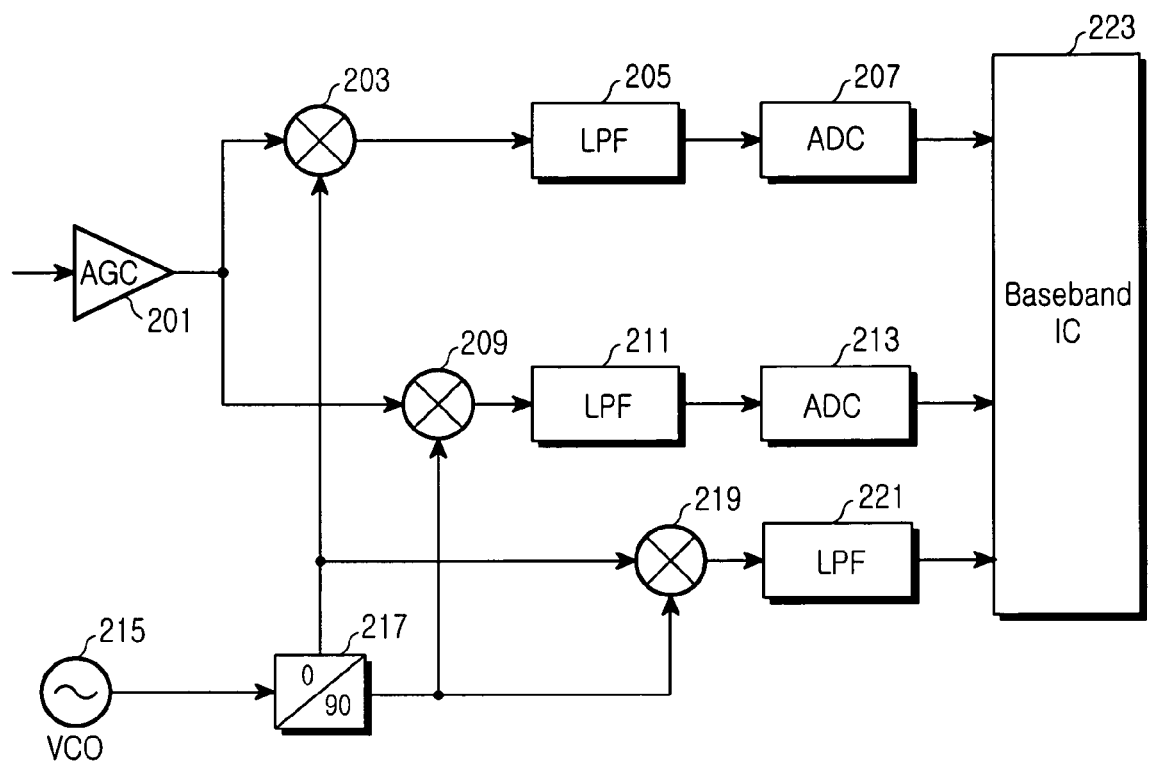
FIG. 2 is a diagram of an RF module of a QPSK demodulator for compensating for a phase mismatch error according to a preferred embodiment of the present invention.

FIG. 2 is a diagram of an RF module of a QPSK demodulator for compensating for a phase mismatch error according to a preferred embodiment of the present invention.

Referring to FIG. 2, the QPSK demodulator includes the RF module for performing RF processing, which includes an AGC 201, a first mixer 203, a first LPF 205, a first ADC 207, a second mixer 209, a second LPF 211, a second ADC 213, a VCO 215, a phase shifter 217, and a phase mismatch extractor module for compensating for a phase mismatch, which includes a third mixer 219 and a third LPF 221. The QPSK demodulator further includes a baseband IC 223 for processing a baseband signal.

The AGC 201 amplifies a QPSK signal by controlling the gain of the QPSK demodulator demodulating the QPSK signal to maintain the outputs of the first ADC 207 and the second ADC 213 at desired levels. The I-channel signal output from the AGC 201 is input to the first mixer 203, and the Q-channel signal is input to the second mixer 209. The I-channel signal is mixed with an I-channel demodulation signal received from the phase shifter 217 by the first mixer 203. The VCO 215 generates a frequency, as controlled by a voltage, and outputs the generated frequency to the phase shifter 217. The phase shifter 217 receives a local oscillation signal output from the VCO 215 and generates the I-channel demodulation signal and a Q-channel demodulation signal, which have a phase difference of 90° from each other.

The first mixer 203 receives the I-channel demodulation signal output from the phase shifter 217, mixes it with the I-channel signal, and outputs the mixed I-channel signal to the first LPF 205. The first LPF 205 receives the output signal of the first mixer 203, filters the signal, and outputs the filtered signal to the first ADC 207. The first ADC 207 receives the signal filtered by the first LPF 205, analog-to-digital converts the received signal, and outputs the digital signal to the baseband IC 223.

The Q-channel signal is mixed with the Q-channel demodulation signal received from the phase shifter 217 by the second mixer 209. The second mixer 209 receives the Q-channel demodulation signal output from the phase shifter 217, mixes it with the Q-channel signal, and outputs the mixed Q-channel signal to the second LPF 211. The second LPF 211 receives the output signal of the second mixer 209, filters the signal, and outputs the filtered signal to the second ADC 213. The second ADC 213 receives the signal filtered by the second LPF 211, converts the received analog signal to a digital signal, and outputs the digital signal to the baseband IC 219.

The baseband IC 223 receives the RF processed I-channel signal and Q-channel signal and demodulates the QPSK signal.

An operation of the embodiment will now be described with reference to the following equations. The VCO 215 generates a local oscillation signal of $2\omega t$, twice the frequency of an RF receive signal. The phase shifter 217 receiving the local oscillation signal of $2\omega t$ generates an I-channel modulation signal and a Q-channel modulation signal using an analog flipflop operating at a rising edge and a falling edge. The I-channel modulation signal output from the phase shifter 217 is $\sin(\omega t)$, and the Q-channel modulation signal is $\cos(\omega t+\phi)$, wherein $\phi$ denotes a phase error causing the phase mismatch.

An output signal of the AGC 201 is represented by Equation 1.

$$S(t)=I(t)\sin(\omega t)+Q(t)\cos(\omega t) \qquad (1)$$

The signal represented by Equation 1 is mixed with the output signals of the phase shifter 217, $\sin(\omega t)$ and $\cos(\omega t+\phi)$, by the first mixer 203 and the second mixer 209, respectively. Output signals of the first mixer 203 and the second mixer 209 in which the I-channel modulation signal and the Q-channel modulation signal are mixed, respectively, are represented by Equation 2.

$$S_I(t) = S(t)\sin(\omega t) = \qquad (2)$$
$$\frac{1}{2}I(t)\{\cos(2\omega t) - \cos(0)\} + \frac{1}{2}Q(t)\{\sin(2\omega t) - \sin(0)\}$$
$$S_Q(t) = S(t)\cos(\omega t + \phi) =$$
$$\frac{1}{2}I(t)\{\sin(2\omega t + \phi) - \sin(\phi)\} + \frac{1}{2}Q(t)\{\cos(2\omega t + \phi) - \cos(\phi)\}$$

The signals output from the first mixer 203 and the second mixer 209 are filtered by the first LPF 205 and the second LPF 211, respectively, thereby removing a frequency component represented by $2\omega t$. The signal obtained by passing the output signal of the first mixer 203 through the first LPF 205 and the signal obtained by passing the output signal of the second mixer 209 through the second LPF 211 are represented by Equation 3.

$$\overline{S}_I(t) = -\frac{1}{2}I(t) \qquad (3)$$
$$\overline{S}_Q(t) = -\frac{1}{2}I(t)\sin(\phi) + \frac{1}{2}Q(t)\cos(\phi)$$

The signals filtered by the first LPF 205 and the second LPF 211 are input to the first ADC 207 and the second ADC 213, analog-to-digital converted, and input to the baseband IC 223.

To remove the phase error, i.e. the φ component, the RF module extracts a phase mismatch function, which is used to compensate for the phase mismatch, using the phase mismatch extractor module, which is comprised of the third mixer 219 and the third LPF 221. In the phase mismatch extractor module, both of the output signals of the phase shifter 217, i.e. the I-channel modulation signal and the Q-channel modulation signal, are mixed by the third mixer 219. An output signal of the third mixer 219 is represented by Equation 4.

$$\sin(\omega t)\cos(\omega t + \Phi) = \frac{1}{2}\{\sin(2\omega t + \Phi) - \sin(\Phi)\} \qquad (4)$$

The output signal obtained by mixing the demodulation signals in the third mixer 219 is filtered by the third LPF 221. An output signal of the third LPF 221 is represented by Equation 5.

$$-\frac{1}{2}\sin(\Phi) \qquad (5)$$

The output signal of the third LPF 221 is represented by a pattern of a phase mismatch function, i.e. a phase mismatch sine function that includes a phase error. The signal before the filtering is a signal that includes the phase mismatch function. That is, the third mixer 219 outputs the signal that includes the phase mismatch function to the third LPF 221, and the third LPF 221 extracts the phase mismatch function.

After the phase mismatch function is extracted, the baseband IC 223 receives the phase mismatch function and removes the phase error using the phase mismatch function. A configuration of the baseband IC 223 will now be described with reference to FIG. 3.

Figure 3:
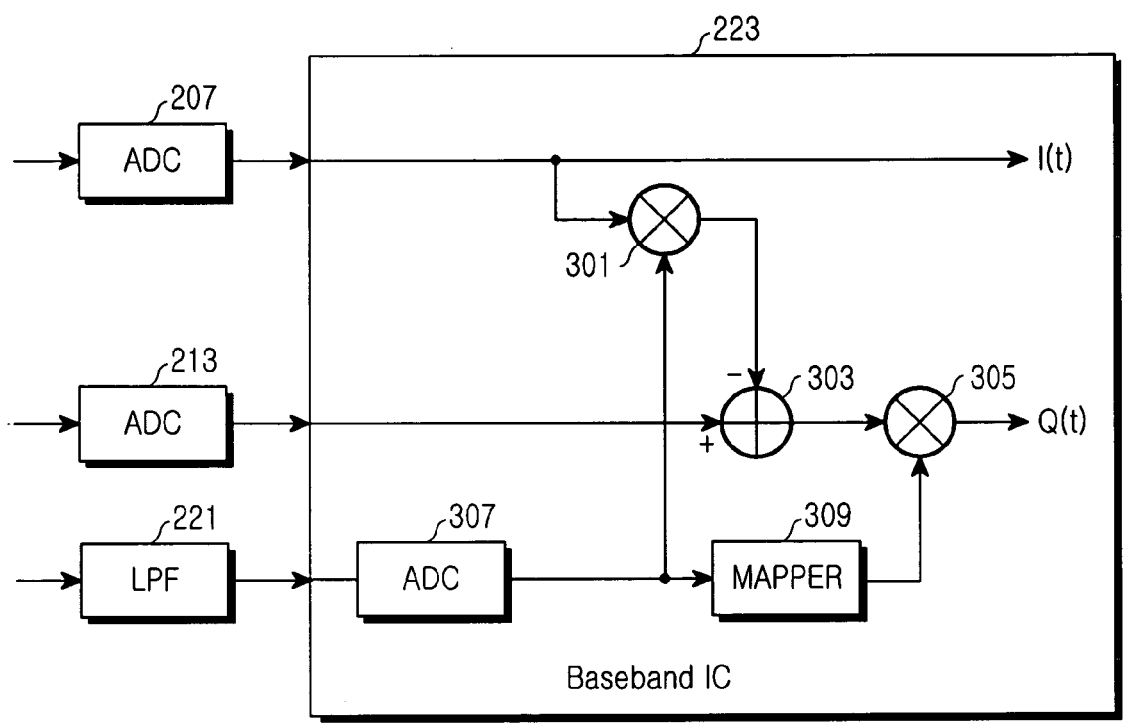
FIG. 3 is a diagram of a baseband IC of the QPSK demodulator for compensating for a phase mismatch error according to the preferred embodiment of the present invention.

FIG. 3 is a diagram of the baseband IC 223 of the QPSK demodulator for compensating for a phase mismatch error according to the preferred embodiment of the present invention.

Referring to FIG. 3, the baseband IC 223 includes a phase error compensator module to compensate for the phase mismatch error, which is comprised of a fourth mixer 301, an adder 303, a fifth mixer 305, a third ADC 307, and a mapper 309.

The baseband IC 223 receives output signals of the first ADC 207 and the second ADC 213. The baseband IC 223 also receives the phase mismatch function output from the third LPF 221. The third ADC 307 analog-to-digital converts the phase mismatch function. The analog-to-digital converted phase mismatch function, $$\frac{1}{2}\sin(\phi),$$

is input to the mapper 309 to be mixed with the Q-channel signal received to compensate for the phase mismatch. The mapper 309 removes the phase error by mapping the phase mismatch function to a cosine function. That is, the phase mismatch function is mapped to a $$\frac{1}{\cos(\phi)}$$

signal, i.e. a cosine function signal having a unit fractional pattern. In other words, the mapper 309 maps the phase mismatch function to the $$\frac{1}{\cos(\phi)}$$

signal, i.e. a first compensation signal. To do this, the mapper 309 stores a table for generating the first compensation signal in response to a received signal by setting the table through experimentation, and maps the received phase mismatch function to the first compensation signal.

In addition, the analog-to-digital converted phase mismatch function, $$\frac{1}{2}\sin(\phi),$$

is mixed with the baseband I-channel signal, which is the output signal of the first ADC 207, by the fourth mixer 301. An output signal of the fourth mixer 301 to compensate for the phase mismatch, i.e. a second compensation signal, is represented by Equation 6.

$$-\frac{1}{2}\sin(\phi) \cdot \overline{S}_I(t) = -\frac{1}{2}I(t)\sin(\phi) \qquad (6)$$

The fourth mixer 301 extracts a negative value of the second compensation signal for compensating for the phase mismatch and outputs the negative value to the adder 303. The adder 303 receives the second compensation signal and the baseband Q-channel signal, which is the output signal of the second ADC 213, and adds the two signals. An output signal of the adder 303 is represented by Equation 7.

$$\frac{1}{2}Q(t)\cos(\Phi) \qquad (7)$$

A third compensation signal, which is the output signal of the adder 303, includes the phase error, i.e. a cosine function of φ, which causes distortion on the Q-channel signal. The third compensation signal is mixed with the first compensation signal, which is mapped to the cosine function by the mapper 309, by the fifth mixer 305 and output to a Q-channel. Thus, the baseband IC 223 restores the QPSK signal transmitted from a transmission end using the signal obtained by compensating for the phase mismatch generated due to the phase error.

In the present embodiment, though a structure for compensating for the Q-channel demodulation signal by applying the phase error to the Q-channel demodulation signal has been described, the QPSK demodulator can be configured by applying the phase error to the I-channel demodulation signal. The structure of the QPSK demodulator can be expanded and applied to a demodulator using the I-channel demodulation signal and the Q-channel demodulation signal.

As described above, according to the embodiment of the present invention, an apparatus for compensating for a phase mismatch using output signals of a phase shifter in a QPSK demodulator is suggested, and by using the QPSK demodulator, it is possible to compensate for a phase error of an I-channel signal and a Q-channel signal and a phase mismatch due to an I-channel demodulation signal and a Q-channel demodulation signal. In addition, using the structure described herein, QPSK demodulation can be more precisely performed by compensating for the phase mismatch with a simple circuit, and circuit complexity can be reduced by performing digital signal processing in a baseband IC.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for compensating for a phase mismatch in a Quadrature Phase Shift Keying (QPSK) demodulator, the apparatus comprising:
a phase mismatch extractor module for generating a signal including a phase mismatch function by mixing an I-channel demodulation signal and a Q-channel demodulation signal, which are output signals of a phase shifter, and extracting the phase mismatch function by filtering the generated signal; and
a phase mismatch compensator module for digital-converting the phase mismatch function, mapping the digital-converted phase mismatch function to a first compensation signal for, generating a second compensation signal for by mixing the digital-converted phase mismatch function with a baseband I-channel signal, generating a third compensation signal for by adding a baseband Q-channel signal to the second compensation signal, and mixing the first compensation signal with the third compensation signal.

2. The apparatus of claim 1, wherein the phase mismatch extractor module is included in a radio frequency (RF) module.

3. The apparatus of claim 1, wherein the phase mismatch compensator module is included in a baseband integrated circuit (IC).

4. The apparatus of claims 1, wherein the first compensation signal is obtained by mapping the phase mismatch function to a cosine function having a unit fractional pattern.

5. The apparatus of claim 1, wherein the third compensation signal is generated by adding the baseband Q-channel signal to a value obtained by applying a negative value to the second compensation signal.

6. The apparatus of claim 1, wherein the phase mismatch extractor module comprises:
a mixer for mixing the I-channel demodulation signal and the Q-channel demodulation signal, the I-channel and Q-channel demodulation signals being output signals of the phase shifter; and
a low pass filter (LPF) for filtering the signal to extract the phase mismatch function.

7. The apparatus of claim 6, wherein the mixer and the LPF are included in the RF module.

8. The apparatus of claim 1, wherein the phase mismatch compensator module comprises:
an analog-to-digital converter (ADC) for digital-converting the phase mismatch function;
a mapper for mapping the digital-converted phase mismatch function to the first compensation signal, which is a cosine function;
a first mixer for generating the second compensation signal by mixing the digital-converted phase mismatch function with the baseband I-channel signal;
an adder for generating the third compensation signal by adding the second compensation signal to the baseband Q-channel signal; and
a second mixer for mixing the first compensation signal with the third compensation signal.

9. The apparatus of claim 8, wherein the ADC, the mapper, the first mixer, the adder, and the second mixer are included in the baseband IC.

10. The apparatus of claim 8, wherein the first compensation signal is obtained by mapping the phase mismatch function to a cosine function having a unit fractional pattern.

11. The apparatus of claim 8, wherein the third compensation signal is generated by adding the baseband Q-channel signal to a value obtained by applying a negative value to the second compensation signal.

* * * * *